(12) United States Patent
Iwamoto

(10) Patent No.: US 9,195,110 B2
(45) Date of Patent: Nov. 24, 2015

(54) LIQUID CRYSTAL DISPLAY DEVICE AND PROCESS FOR PRODUCING THE SAME

(71) Applicant: STANLEY ELECTRIC CO., LTD., Meguro-ku, Tokyo (JP)

(72) Inventor: Yoshihisa Iwamoto, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 289 days.

(21) Appl. No.: 13/723,479

(22) Filed: Dec. 21, 2012

(65) Prior Publication Data

US 2013/0169908 A1 Jul. 4, 2013

(30) Foreign Application Priority Data

Dec. 28, 2011 (JP) ................................ 2011-289437

(51) Int. Cl.
*G02F 1/1337* (2006.01)
*G02F 1/139* (2006.01)
*G02F 1/1333* (2006.01)
*G02F 1/1339* (2006.01)

(52) U.S. Cl.
CPC .............. *G02F 1/139* (2013.01); *G02F 1/1333* (2013.01); *G02F 1/133707* (2013.01); *G02F 1/13394* (2013.01); *G02F 2001/133742* (2013.01)

(58) Field of Classification Search
CPC ................................................... G02F 1/13394
USPC ......................................... 349/156, 157, 130
See application file for complete search history.

(56) References Cited

U.S. PATENT DOCUMENTS

| 4,889,412 | A | 12/1989 | Clerc et al. |
| 6,281,956 | B1 | 8/2001 | Ohmuro et al. |
| 6,642,981 | B1 | 11/2003 | Chida et al. |
| 6,717,645 | B2 * | 4/2004 | Shimoshikiryou et al. ... 349/141 |
| 2008/0007687 | A1 * | 1/2008 | Konno ........................... 349/156 |
| 2008/0123043 | A1 * | 5/2008 | Li et al. .......................... 349/156 |

(Continued)

FOREIGN PATENT DOCUMENTS

| JP | 62-210423 A | 9/1987 |
| JP | 2047880 C | 4/1996 |

(Continued)

OTHER PUBLICATIONS

Translation of Detailed Description of JP 2001264773 A.*

(Continued)

*Primary Examiner* — Bumsuk Won
*Assistant Examiner* — Kendrick Hsu
(74) *Attorney, Agent, or Firm* — Holtz, Holtz, Goodman & Chick PC

(57) ABSTRACT

A liquid crystal display comprising: a vertically aligned liquid crystal layer located between a first and a second substrate, a first and a second polarizing layer, and an optical compensation plate having negative biaxial optical anisotropy; wherein at least either the first or the second substrate has protrusions having approximately the same first height and protruding into the liquid crystal layer, the protrusions being formed only inside of the sealing material, the liquid crystal layer in the protrusion-free position having a second height, and the area of the region in which the thickness of the liquid crystal layer is equal to the value obtained by subtracting the first height from the second height as a result of the existence of the protrusions accounting for α%, which belongs to 5% to 50%, of the area of the region where the liquid crystal layer exists on the substrate with protrusions.

8 Claims, 14 Drawing Sheets

(56) References Cited

U.S. PATENT DOCUMENTS

| | | | |
|---|---|---|---|
| 2009/0244457 A1* | 10/2009 | Onishi et al. | 349/123 |
| 2011/0128471 A1* | 6/2011 | Suckling et al. | 349/62 |
| 2012/0120338 A1 | 5/2012 | Takeda et al. | |

FOREIGN PATENT DOCUMENTS

| | | | |
|---|---|---|---|
| JP | 11242225 A | 9/1999 | |
| JP | 2000-131693 A | 5/2000 | |
| JP | 2001264773 A | 9/2001 | |
| JP | 2005-234254 A | 9/2005 | |
| JP | 2008-233412 A | 10/2008 | |

OTHER PUBLICATIONS

Japanese Office Action (and English translation thereof) dated Jul. 21, 2015, issued in counterpart Japanese Application No. 2011-297437.

* cited by examiner

LIQUID CRYSTAL DISPLAY DEVICE AND PROCESS FOR PRODUCING THE SAME

CROSS-REFERENCE TO RELATED APPLICATION

This application is based upon and claims the benefit of priority of the prior Japanese Patent Application No. JP 2011-289437, filed on Dec. 28, 2011, the entire contents of which are incorporated herein by reference.

BACKGROUND OF THE INVENTION

A) Field of the Invention

This invention relates to a liquid crystal display device and a process for producing the same.

B) Description of the Related Art

For a vertical alignment type liquid crystal display device in which liquid crystal molecules in a liquid crystal layer are aligned vertically or substantially vertically to the substrate, its transmittance in the absence of applied voltage is very low and almost equivalent to the optical characteristics of two polarizers placed substantially in crossed-Nicol. If an optical compensation plate having negative optical anisotropy with an appropriate parameter is introduced between the liquid crystal layer and one or both of the two polarizers sandwiching it, better viewing characteristics can be obtained.

A method of performing viewing angle compensation by using an optical compensation plate having negative uniaxial optical anisotropy, so-called (negative) C plate, as a viewing angle compensation plate is described in Japanese Unexamined Patent Publication (Kokai) No. SHO-62-210423. By this method, optical anisotropy of a vertically aligned liquid crystal layer can be canceled to eliminate viewing angle characteristics in the absence of applied voltage. However, light leakage takes place when the viewing angle is changed, particularly when observing from an azimuthal angle of approximately 45° from the absorption axis of one of two substantially crossed-Nicol polarizers. This phenomenon occurs because there exist viewing angle characteristics of the polarizers themselves and it is known that this phenomenon causes deterioration of viewing angle characteristics.

As a method to solve the problem, Japanese Patent 2047880 proposes the use of an optical compensation plate having negative biaxial optical anisotropy (biaxial film). In addition, Japanese Unexamined Patent Publication (Kokai) No. 2000-131693 describes examples of particularly effective parameters for biaxial films. By adopting a liquid crystal display device using a biaxial film, deterioration of viewing angle characteristics due to polarizers, which poses a problem when a C plate is used, can be eliminated, allowing a black display feature almost equivalent to that observed from the front to be realized even if a liquid crystal display device is observed from an azimuthal angle of approximately 45° from the absorption axis of a polarizer.

The present inventor has proposed a vertical alignment type liquid crystal display device that achieved uniform mono-domain alignment by means of rubbing treatment in Japanese Unexamined Patent Publication (Kokai) No. 2005-234254. The above-mentioned viewing angle compensating method can also be applied to this liquid crystal display device.

However, even in a vertical alignment type liquid crystal display device using a biaxial film, when observed from a large polar angle at an azimuthal angle of 45° with respect to the absorption axis of a polarizer (large polar angle with respect to the normal direction of a polarizer), leaked light of blue, violet, or other colors is sometimes observed in the absence of applied voltage. When a C plate is used, leaked light having a color is not observed even if observed from a large polar angle at an azimuthal angle of 45° with respect to the absorption axis of a polarizer although light leakage is large because the viewing angle characteristics of the polarizer cannot be compensated.

As a viewing angle compensation plate for a vertical alignment type liquid crystal display device, biaxial films capable of reducing light leakage have been widely used because numerical excellence of viewing angle characteristics is prioritized, and products available on the market include biaxially stretched films formed of norbornene-based cyclic olefin material, and stretched TAC films produced by stretching TAC material used as base. On the other hand, for optical films having optical characteristics equivalent to a C plate, the availability on the market has been rapidly reduced and they are difficult to obtain.

In Japanese Unexamined Patent Publication (Kokai) No. 2008-233412, the present inventor has proposed a vertical alignment type liquid crystal display device in which random recesses and protrusions are formed on the surface on the liquid crystal layer side of at least one substrate. By making use of the phenomenon that in a vertical alignment type liquid crystal display device using a biaxial film, the color tone of leaked light changes variously in the visible light wavelength range with a change in the thickness of the liquid crystal layer when observed from a large polar angle at an azimuthal angle of 45° with respect to the absorption axis of a polarizer, many regions with different liquid crystal layer thicknesses are distributed at random in the liquid crystal layer and various colored lights are mixed to obtain a neutral-color appearance so that the transmissivity of the leaked light is reduced significantly while the color tone of the leaked light is maintained equivalent to that for the conventional C plate compensation.

For the liquid crystal display device described in Japanese Unexamined Patent Publication (Kokai) No. 2008-233412, random protrusions and recesses need to be formed on at least one of the two substrates. For their formation, though some methods including the use of chemical etching of a glass substrate (frost processing), the use of physical etching (sand blast processing), and coating of a substrate with a hard coat agent after spraying particles on the substrate have been proposed, all of them require high cost. Moreover, because these methods assume that treatment is performed on the whole surface of a mother glass, there are cases where protrusions and recesses are formed also on an external extraction electrode (electrode terminal) that connects a liquid crystal display device to an external driving circuit and protrusions and recesses are formed even on the seal frame region that bonds two substrates, resulting in a danger of the lowering of the production yield. In addition, because presently manufactured liquid crystal display devices adopt multiple electrode patterns in which a plurality of liquid crystal display devices are arranged on a surface of a mother glass before two glass substrates are assembled, the alignment marks for assembling can become blurred due to light scattering on the surfaces of the stacked substrates if protrusions and recesses are formed on the whole surface of the mother glass, affecting the production yield adversely. In the appearance observation of a liquid crystal display device, display non-uniformity may be observed in any of the light display regions, dark display regions, and regions where no voltage is applied (background region) because protrusions and recesses are arranged in random. This is considered to be caused by light scattering due to the refractive index difference between protrusions or recesses on the substrate and the liquid crystal layer.

SUMMARY OF THE INVENTION

The purpose of this invention is to provide high quality liquid crystal display devices and a production process thereof.

An aspect of the present invention provides a liquid crystal display device comprising a first and a second substrate placed substantially in parallel to each other, each having a transparent electrode; a sealing material being in the shape of a frame and placed between the first and second substrates; a vertically aligned liquid crystal layer located between the first and second substrates, placed within the inner region of the frame of the sealing material, and filled with liquid crystal material with negative dielectric anisotropy; a first and a second polarizing layer placed substantially in crossed-Nicol, the first polarizing layer being placed on the opposite side of the first substrate to the liquid crystal layer, the second polarizing layer being placed on the opposite side of the second substrate to the liquid crystal layer, and one of the polarizing layers having an absorption axis at approximately 45° with respect to the alignment direction of the liquid crystal molecules located at the thickness center of the liquid crystal layer in the presence of applied voltage; and an optical compensation plate having negative biaxial optical anisotropy, placed at least either between the first substrate and the first polarizing layer or between the second substrate and the second polarizing layer, and disposed so that the in-plane slow axis direction is substantially orthogonal to the absorption axis direction of the proximate first or second polarizing layer; wherein at least either the first or the second substrate has a plurality of protrusions having approximately the same first height and protruding into the liquid crystal layer, the plurality of protrusions being formed only within the inner region of the frame of the sealing material, the liquid crystal layer in the protrusion-free position having a second height, and the area of the region in which the thickness of the liquid crystal layer is equal to the value obtained by subtracting the first height from the second height as a result of the existence of the protrusions accounting for α%, which is 5% or more but not more than 50%, of the area of the region where the liquid crystal layer exists on the substrate with protrusions.

Another aspect of the present invention provides a liquid crystal display device manufacturing process comprising using a pair of mother substrates to produce a plurality of liquid crystal display devices, each comprising a first and a second substrate placed substantially in parallel to each other, each having a transparent electrode; a sealing material placed between the first and second substrates in the shape of a frame; a vertically aligned liquid crystal layer located between the first and second substrates, placed within the inner region of the frame of the sealing material, and filled with liquid crystal material with negative dielectric anisotropy; a first and a second polarizing layer placed substantially in crossed-Nicol, the first polarizing layer being placed on the opposite side of the first substrate to the liquid crystal layer, the second polarizing layer being placed on the opposite side of the second substrate to the liquid crystal layer, and one of the polarizing layers having an absorption axis at approximately 45° with respect to the alignment direction of the liquid crystal molecules located at the thickness center of the liquid crystal layer in the presence of applied voltage; and an optical compensation plate having negative biaxial optical anisotropy, placed at least either between the first substrate and the first polarizing layer or between the second substrate and the second polarizing layer, and disposed so that the in-plane slow axis direction is substantially orthogonal to the absorption axis direction of the proximate first or second polarizing layer; wherein at least either the first or the second substrate has a plurality of protrusions having approximately the same first height and protruding into the liquid crystal layer side, the plurality of protrusions being formed only within the inner region of the frame of the sealing material, the liquid crystal layer in the protrusion-free position having a second height, and the area of the region in which the thickness of the liquid crystal layer is equal to the value obtained by subtracting the first height from the second height as a result of the existence of the protrusions accounting for α%, which is 5% or more but not more than 50%, of the area of the region where the liquid crystal layer exists on the substrate having protrusions; and wherein such protrusions as above are not formed outside the region of the frame of the sealing material on the mother substrates.

The invention can provide high quality liquid crystal display devices and their production process.

DESCRIPTION OF EMBODIMENTS

First of all, the present inventor performed simulation analysis for light leakage in a conventional liquid crystal display device.

Figure 1A:
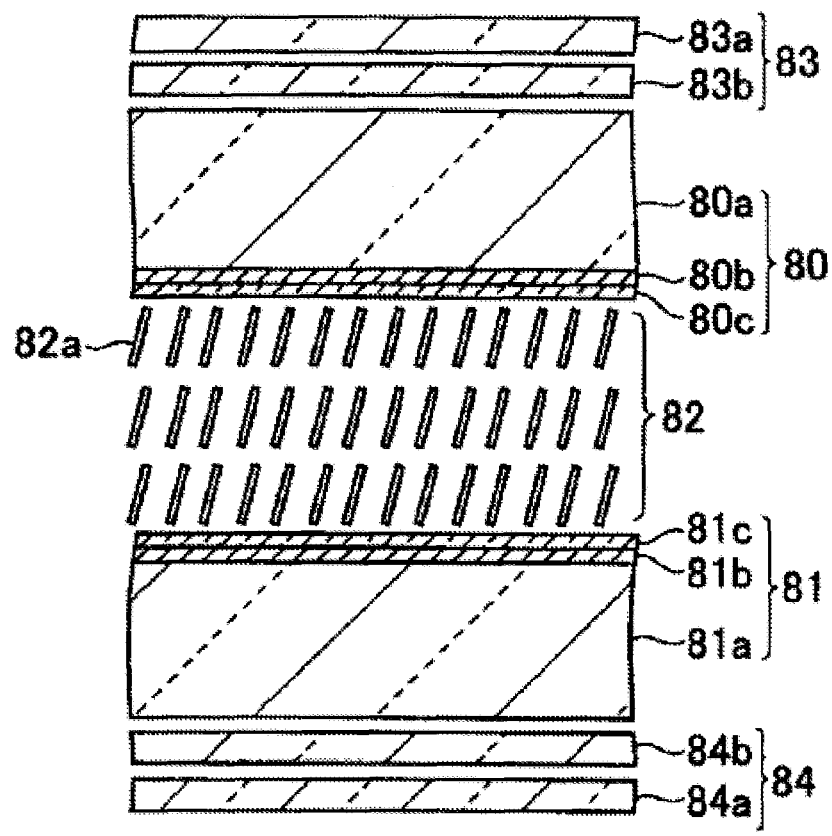
FIGS. 1A and 1B are a schematic cross-sectional view and perspective view, respectively, illustrating a conventional example of a liquid crystal display device.
Figure 1B:
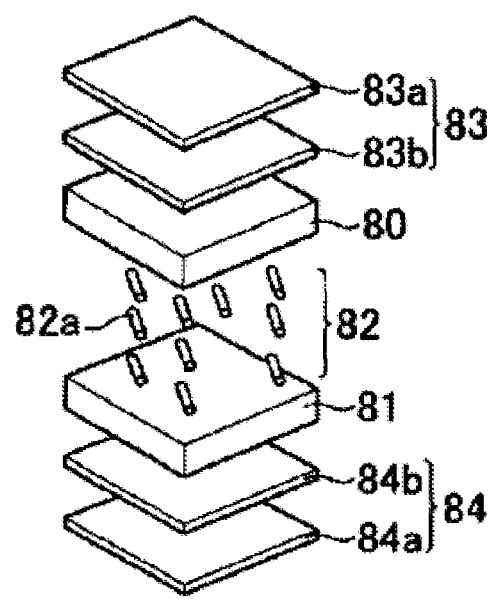

FIGS. 1A and 1B are a cross-sectional view and a perspective view, respectively, schematically illustrating a conventional example of a liquid crystal display device under simulation analysis.

The liquid crystal display device in the conventional example comprises an upper substrate (segment substrate) (80) and a lower substrate (common substrate) (81) that are placed opposite to each other and substantially in parallel, a liquid crystal layer (82) placed between both the plates (80) and (81), and an upper polarizer (83) and a lower polarizer (84).

The upper substrate (80) includes an upper glass substrate (transparent substrate) (80*a*), an upper transparent electrode (segment electrode) (80*b*) formed on the upper glass substrate (80*a*), and an upper alignment film (80*c*) formed on the upper electrode (80*b*). In the same manner, the lower substrate (81) includes a lower glass substrate (transparent substrate) (81*a*), a lower transparent electrode (common electrode) (81*b*) formed on the lower glass substrate (81*a*), and a lower alignment film (81*c*) formed on the lower electrode (81*b*).

The upper and lower electrodes (80*b*) and (81*b*) are formed of ITO or the like and patterned so that the desired design can be displayed. The liquid crystal layer (82) is a vertically aligned liquid crystal layer. The liquid crystal layer (82) is filled with liquid crystal material having negative dielectric anisotropy.

The upper polarizer (83) includes a polarizing layer (83*a*) and a TAC layer (83*b*), and is placed on the opposite surface of the upper substrate (80) to the surface facing the liquid crystal layer (82) so that the TAC layer (83*b*) faces the upper glass substrate (80*a*). The TAC layer is known to function as a C plate. The lower polarizer (84) includes a polarizing layer (84*a*) and a viewing angle compensation plate (biaxial film) (84*b*), and is placed on the opposite surface of the lower substrate (81) to the surface facing the liquid crystal layer (82) so that the biaxial film (84*b*) faces the lower glass substrate (81*a*). The upper and lower polarizers (83) and (84) (polarizing layers (83*a*) and (84*a*)) are placed substantially in crossed-Nicol, wherein the absorption axis of one polarizer (polarizing layer) is at approximately 45° with respect to the alignment direction of the central molecules of the liquid crystal layer (82) (liquid crystal molecules (82*a*)) located at the thickness center of the liquid crystal layer (82)) in the presence of applied voltage. The biaxial film (84*b*) is placed so that its in-plane slow axis direction is substantially orthogonal to the absorption axis direction of the proximate polarizing layer (84*a*).

Although not included in the figure, a back light is placed below the lower polarizer (84). The back light is configured using a light source such as a cold cathode tube, an inorganic LED, an organic LED, a light bulb, or the like. The display status of the liquid crystal display device is observed from the upper polarizer (83) side.

In simulation analysis, the color tone associated with light leakage observed from a polar angle of 50° was calculated based on the frontal observation at an azimuthal angle of 45° with respect to the absorption axis of the polarizer by using a liquid crystal display device simulator LCDMASTER7.2 manufactured by Shintech Co., Ltd.

In performing analysis, the retardation of the liquid crystal layer (82), the in-plane retardation of the biaxial film (84*b*) (Re), and the retardation in the thickness direction (Rth) were set to 320 nm, 55 nm, and 220 nm, respectively, and the in-plane slow axis direction was orthogonal to the absorption axis of the proximate polarizing layer (84*a*). For the material, a norbornene plastic film was assumed. The thickness direction retardation (Rth) of the TAC layer (83*b*) that functions as a C plate was set to 50 nm. For the polarizing layers (83*a*) and (84*a*) of the upper and lower polarizers (83) and (84), the use of SKN18243T manufactured by Polatechno Co., Ltd. was assumed, and the absorption axis direction was set to 135° for the upper side and 45° for the lower side. For the liquid crystal layer (82), a mono-domain alignment structure set at a pretilt angle of 89° was assumed, and the pretilt angle was set to an azimuthal angle of 90° at the center of the liquid crystal layer (82). For the light source of the back light, a standard light source D65 was used.

For comparison, the present inventor performed simulation analysis also for a liquid crystal display device using a C plate for compensation, which is described in Japanese Patent 2047880.

Figure 2:
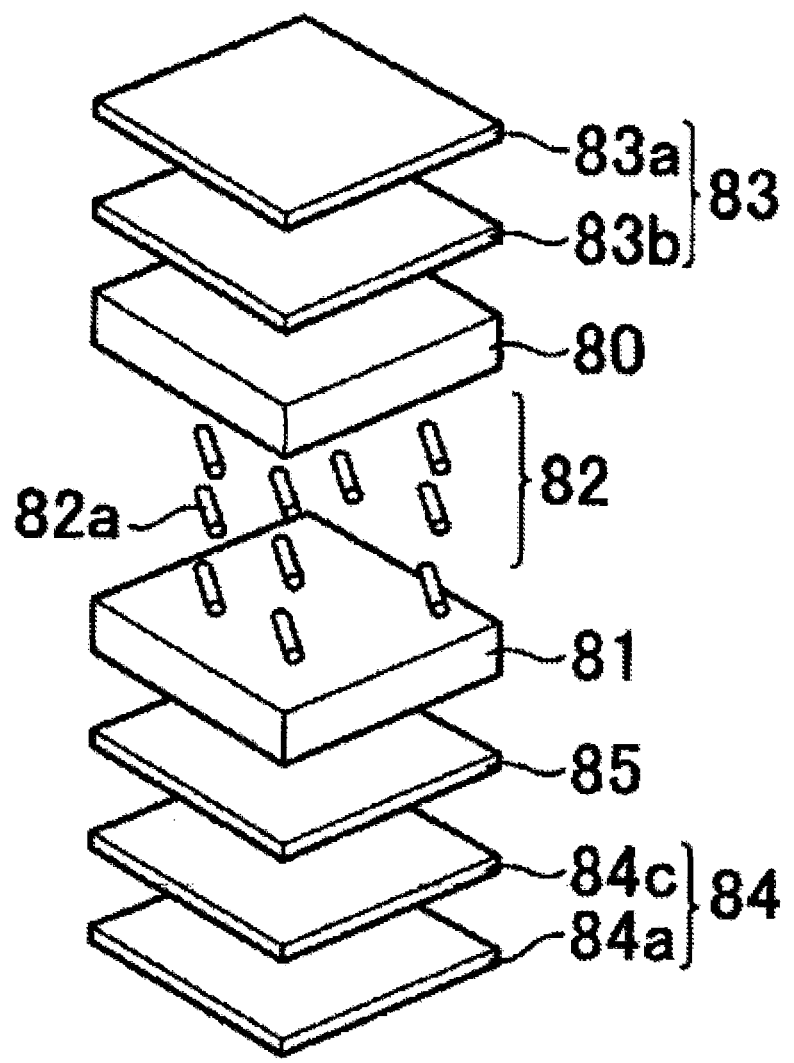
FIG. 2 is a schematic perspective view illustrating a liquid crystal display device according to a comparative example.

FIG. 2 is a schematic perspective view illustrating a liquid crystal display device under simulation analysis as a comparative example. The device in the comparative example is different from the liquid crystal display device illustrated in FIGS. 1A and 1B in that the lower polarizer (84) is configured by laminating the polarizing layer (84*a*) and TAC layer (84*c*) and in that a C plate (85) is placed between the lower polarizer (84) and the lower substrate (81). For the C plate (85), the thickness direction retardation (Rth) was set to 180 nm and a norbornene plastic film was assumed as material. In the other points, the device in this figure is the same as the liquid crystal display device illustrated in FIGS. 1A and 1B.

Figure 3:
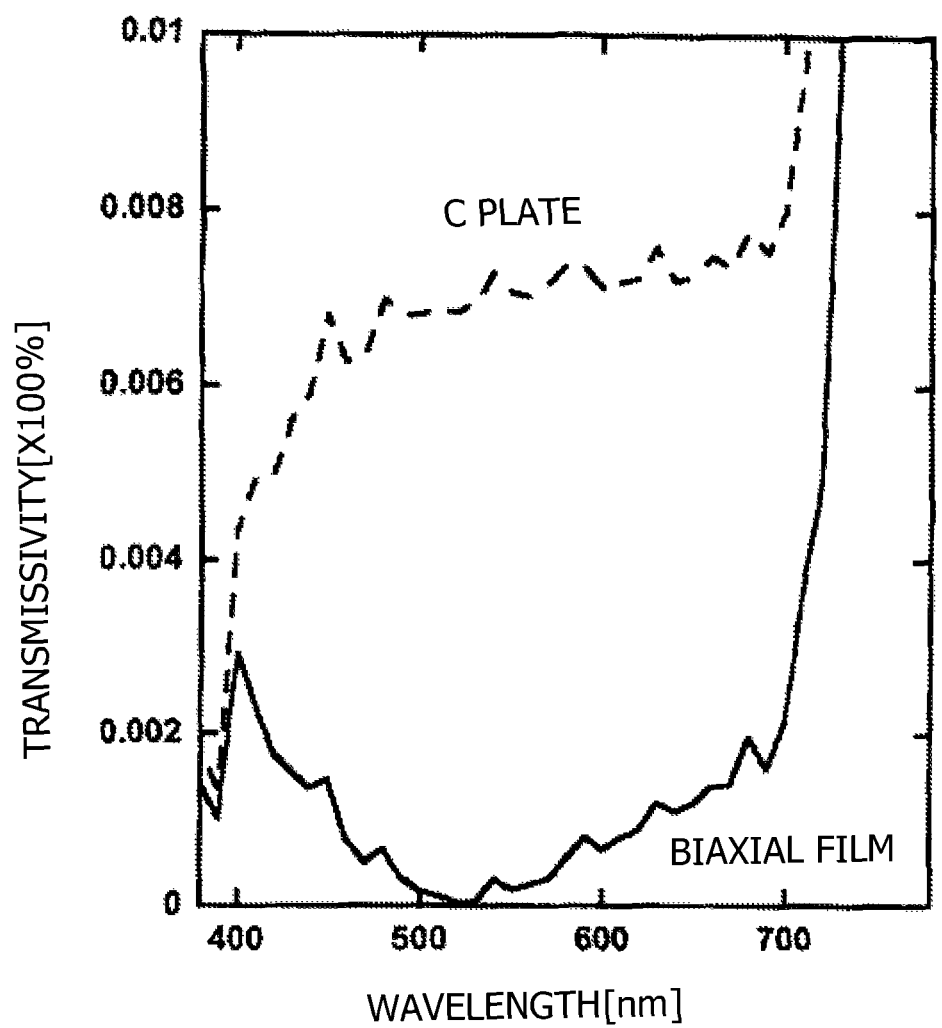
FIG. 3 give graphs illustrating the optical spectra in the absence of applied voltage for liquid crystal display devices according to the conventional example and the comparative example.

FIG. 3 gives graphs illustrating the optical spectra in the absence of applied voltage in a liquid crystal display device according to the conventional example (FIGS. 1A and 1B) or the comparative example (FIG. 2). The simulation analysis results illustrated in the figure are optical spectra in the absence of applied voltage obtained when observed from an azimuthal angle of 0° and a polar angle of 50° measured from the normal to the liquid crystal display device (substrate) defined as the polar angle of 0°. The horizontal axis of the graphs indicates the light wavelength in nm, while the vertical axis indicates the luminous transmissivity in %. The solid and dashed lines indicate the relationships between the wavelength of the leaked light and the luminous transmissivity for a liquid crystal display device using a biaxial film (the liquid crystal display device according to the conventional example illustrated in FIGS. 1A and 1B) and a liquid crystal display device using a C plate (according to the comparative example illustrated in FIG. 2), respectively.

In the liquid crystal display device according to the conventional example illustrated in FIGS. 1A and 1B, a state with almost no light leakage is obtained around 530 nm but light leakage tends to increase as the wavelength shifts toward the short or long end. This is because leaked light is colored.

In the liquid crystal display device according the comparative example illustrated in FIG. 2, it is found that a very large light leakage occurs compared with the liquid crystal display device according to the conventional example. However, the light leakage curve is flat over a wide wavelength range. The present inventor actually created and observed a liquid crystal display device under the same conditions as for the comparative example illustrated in FIG. 2. As a result, the coloring phenomenon was not observed though light leakage was large.

From the simulation result illustrated in FIG. 3, the present inventor considers that light leakage occurs because a biaxial film cannot completely improve the viewing angle characteristics of polarizers over the whole wavelength range and the leaked light is colored in various color tones depending on parameters of the film, liquid crystal layers, or the like.

Figure 4A:
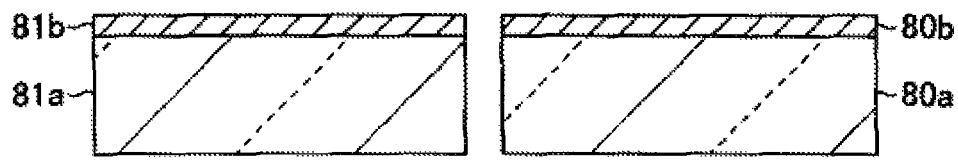
FIGS. 4A to 4D are schematic views illustrating the production process of a liquid crystal display device according to a first embodiment.

FIGS. 4A to 4G are schematic views illustrating the production process of a liquid crystal display device according to a first embodiment. Refer to FIG. 4A. Blue glass substrates (80a) and (81a) with one side polished, undercoated with SiO$_2$ thereon, and an ITO transparent conductive film deposited thereon were created. A desired electrode pattern was formed on the ITO conductive film by photolithography and etching steps, and a segment electrode (80b) and a common electrode (81b) were formed on the glass substrates (80a) and (81a), respectively.

Figure 4B:
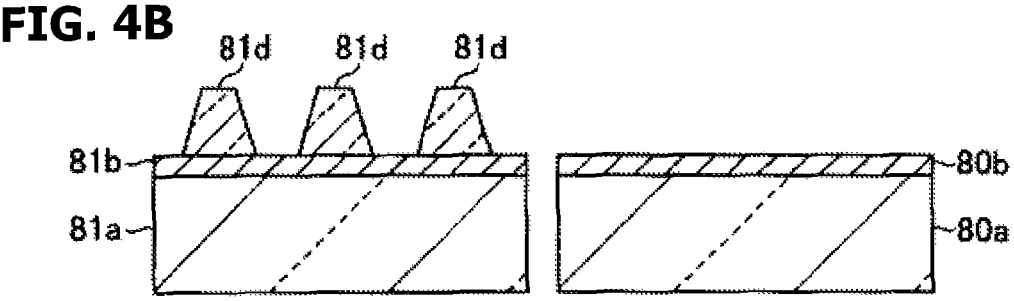

Refer to FIG. 4B. The glass substrate (81a) was rotated for thirty seconds while applying a desired thickness of transparent negative-type photosensitive resin manufactured by Osaka Organic Chemical Industry Ltd. on the common electrode (81b) by using a spinner, followed by pre-baking on a hot plate at 100° C. for 120 seconds to form a resin film. The film thickness can be controlled in a range between approximately 0.5 μm and approximately 5 μm by controlling the rotation speed of the spinner. By using a contact exposure machine equipped with a high-pressure mercury lamp as a light source, the resin-coated surface was exposed to ultra-violet light through a photomask created to form desired columnar protrusions, while maintaining the resin-coated surface and the photomask in substantially complete contact with each other.

Thereafter, photosensitive resin was developed by immersing it in a 1% aqueous solution of tetramethylammonium hydroxide and rinsed with deionized water. After being dried, the substrate was post-baked in a clean oven at 220° C. for 30 minutes to form a plurality of protrusions (81d) with nearly the same height on the common electrode (81b).

Figure 4C:
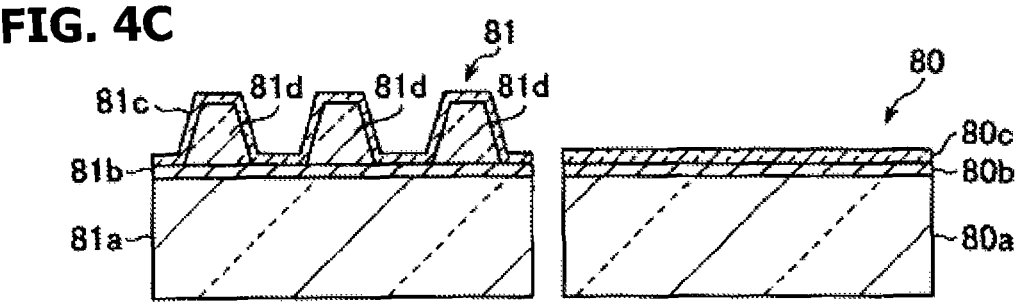

Refer to FIG. 4C. The glass substrates (80a) and (81a) were cleaned with a brush in a weak alkali and deionized water, dried, and dry-cleaned with a low-pressure mercury lamp or atmospheric pressure plasma using an oxygen carrier. Subsequently, by a flexographic method, a vertical alignment film manufactured by Chisso Petrochemical Corporation was pattern-coated on both the substrates. For the common substrate, the common electrode (81b) and the protrusions (81d) were coated, and for the segment substrate, the segment electrode (80b) was coated. In a clean oven, pre-baking was performed at 90° C. for approximately five minutes and post-baking was performed at 160 to 280° C. for 30 to 60 minutes. A vertical alignment film (81c) was formed on the common electrode (81b) and the protrusions (81d), and a vertical alignment film (80c) was formed on the segment electrode (80b).

After post-baking, rubbing treatment was performed on one or both of the substrates. When rubbing treatment is performed only for one substrate, it is preferable that the rubbing treatment is performed on a substrate where the protrusions (81d) do not exist (segment substrate). Note that, for example, as described in Japanese Unexamined Patent Publication (Kokai) No. 2004-252298, rubbing treatment is not necessary if the electrode structure adopted is such that rectangular openings (slits) are arranged in the slits' short-side direction alternately in common electrodes and segment electrodes so that the alignment of liquid crystal molecules can be controlled by fringe electric fields produced in the vicinities of the edges of the slits when a voltage is applied between the electrodes.

Thus, a segment substrate (80) and a common substrate (81) were created.

Figure 4D:
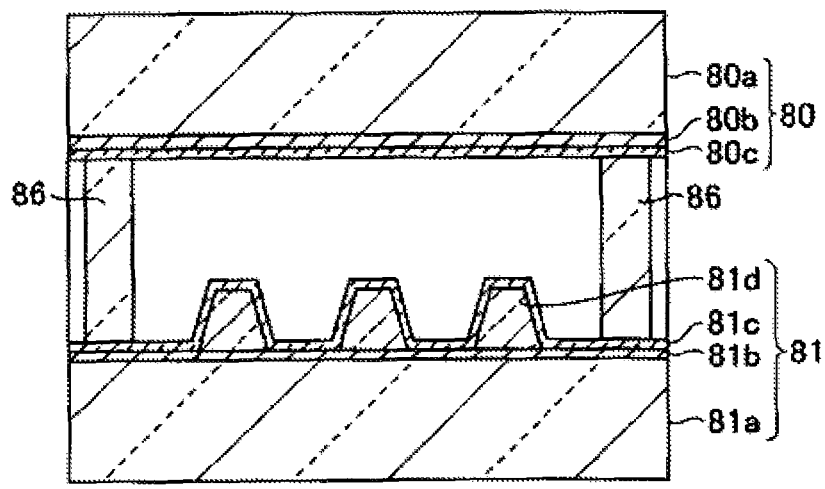

Refer to FIG. 4D. A frame-shaped seal (86) that was slightly smaller than the contour of the region where the two substrates (80) and (81) of the liquid crystal display device overlaps was printed on one substrate. When printing the seal (86), it was arranged so that the protrusions (81d) existed only in the inner region of the frame-shaped seal. For a substrate where the seal (86) was not printed, spherical spacers designed to give a desired cell thickness were placed on the plane at random by a dry spraying method. In the embodiment, STRUCT BOND HC1920 manufactured by Mitsui Chemicals was used as sealing material, HIPRESICA manufactured by Ube-Nitto Kasei was used as glass spacers, and conductive particles AUE manufactured by Sekisui Chemical Co., Ltd. were used as conductive particles in the sealing material.

Both substrates (80) and (81) were brought into close contact so that the electrodes (80b) and (81b) faced each other, and were bonded by thermocompression bonding at 150° C. while improving the cell gap uniformity between the substrates. The firing time was one hour or more.

Figure 4E:
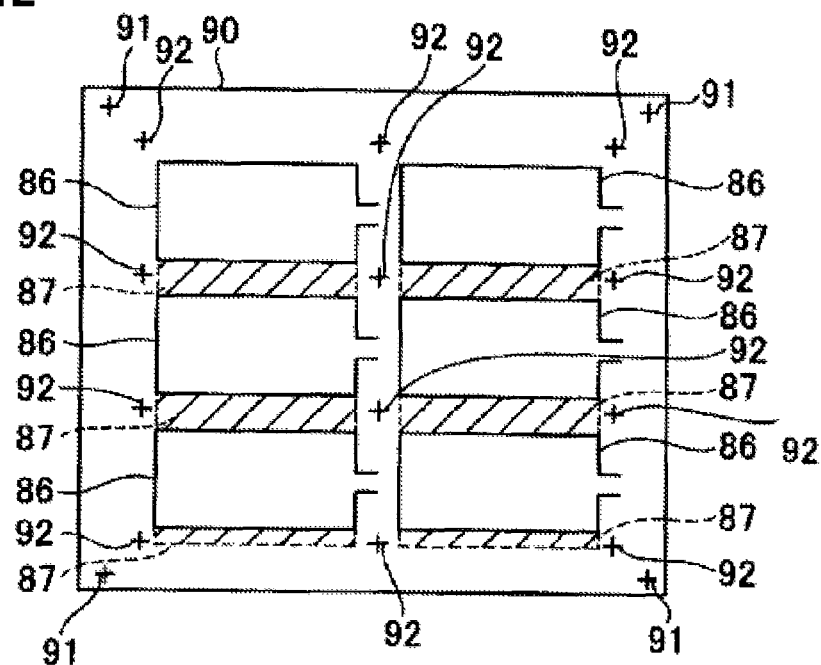
FIGS. 4E to 4F are schematic views illustrating the production process of a liquid crystal display device according to a first embodiment.

Refer to FIG. 4E. The steps explained by referencing FIGS. 4A to 4D were performed to isolate a plurality of regularly arranged liquid crystal display devices from two mother substrates (90) (multiple electrode patterns). FIG. 4E illustrates an example in which six liquid crystal display devices are manufactured on a pair of mother substrates (90). On a mother substrate (90), marks used in the production process such as alignment marks (91) used for aligning when the upper and lower substrates are stacked and cut marks (92) indicating the cutting positions when isolating a plurality of liquid crystal display devices were formed. On the sides of the seal (86) formation portions, external extraction electrodes (87) were formed.

As described above, the protrusions (81d) are placed only in the inner region of the frame-shaped seal (86) and they are not placed on the external extraction electrodes (87), around the edge of the mother substrates (90), on the alignment marks (91), and on the cut marks (92). In other words, protrusions (81d) are not formed on the region other than the inner region of the frame of the seal (86) on the mother substrates (90). For example, if protrusions (81d) are placed on the alignment marks (91) or the cut marks (92), these marks (91) and (92) must be difficult to observe. As a result, it will be difficult to manufacture a liquid crystal display device accurately, which may result in lowering of the manufacturing yield. By placing protrusions (81d) only in the inner region of the frame-shaped seal (86), a liquid crystal display device may be manufactured accurately while avoiding the lowering of the yield.

Figure 4F:
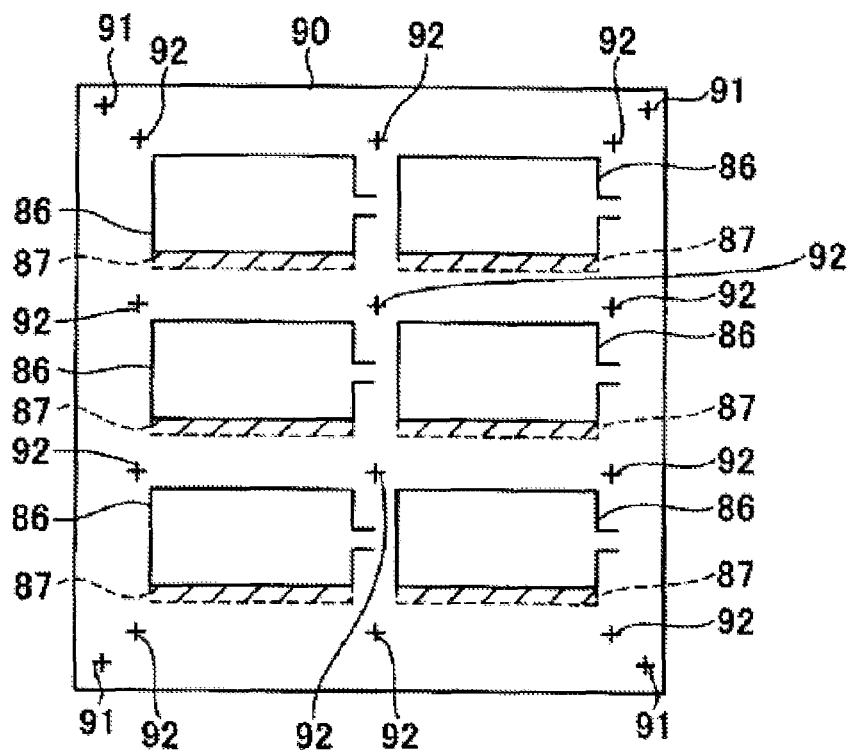

Though FIG. 4E illustrates an example of forming six liquid crystal display devices that border each other on a mother substrate (90), it is also possible to form six liquid crystal display devices that do not border each other as illustrated in FIG. 4F. In this case, protrusions (81d) are not formed between adjacent liquid crystal display devices.

Figure 4G:
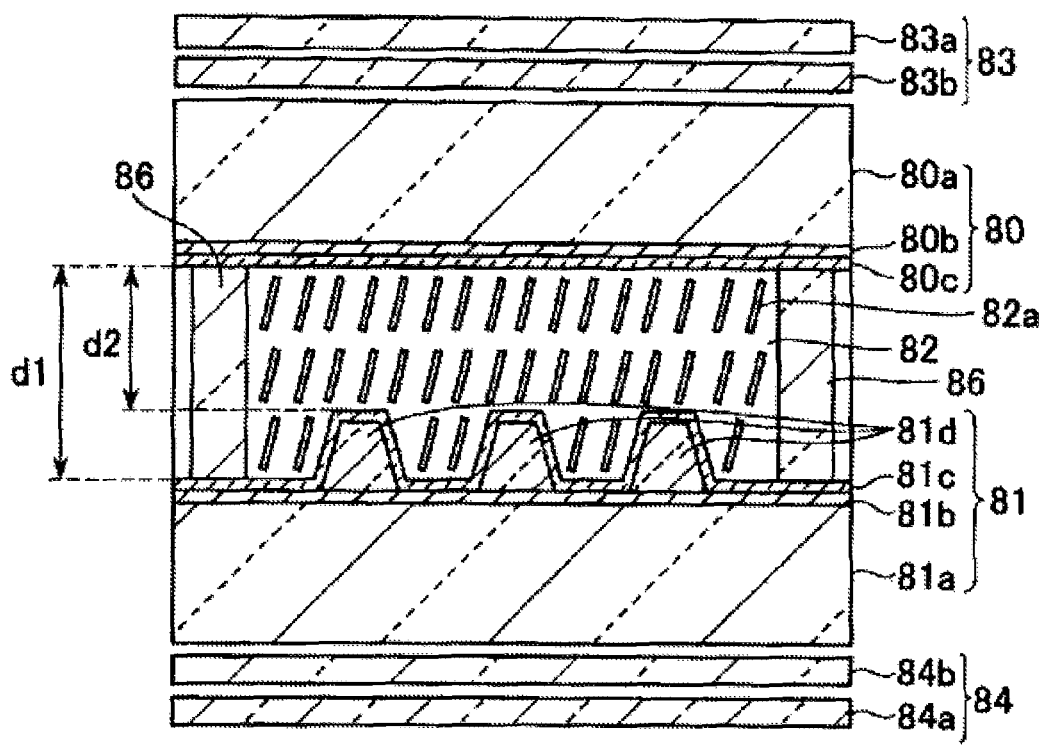
FIG. 4G is a schematic view illustrating the production process of a liquid crystal display device according to a first embodiment.

Refer to FIG. 4G. Subsequent to the step explained by referencing FIG. 4D, each liquid crystal display device is separated by using the cut marks (92) as guides and liquid crystal material is injected into the inner region of the frame of the seal (86) by the vacuum injection method. After that, over-injected liquid crystal material is ejected by pressing the between two substrates. Subsequently, by applying ultra-violet curable resin on the crystal liquid material inlet and releasing the pressed state, the resin slightly penetrates into the region, and then the resin is cured and sealed by irradiating ultra-violet light. After sealing, it is annealed at 120° C. for one hour in an oven, immersed in a detergent for cleaning, rinsed with deionized water, and dried.

On the outer side of the segment substrate (80) and the common substrate (81) (opposite to the side where the liquid crystal layer (82) is placed), the polarizing layers (83a) and (84a) are placed respectively substantially in crossed-Nicol. At least either between the polarizing layer (83a) and the substrate (80) or between the polarizing layer (84a) and the substrate (81), a biaxial film is placed so that its slow axis is substantially orthogonal to the absorption axis of the proximate polarizing layer. FIG. 4G illustrates an example in which the polarizer (83) containing the polarizing layer (83a) and the TAC layer (83b) are attached to the outer side of the segment substrate (80) so that the TAC layer (83b) faces the glass substrate (80a), and the polarizer (84) containing the polarizing layer (84a) and the biaxial film (84b) is attached to the outer side of the common substrate (81) so that the biaxial film (84b) faces the glass substrate (81a).

On the external extraction electrode (87) of the liquid crystal display device manufactured in this way, a flexible substrate or a lead frame for electrically driving the device was mounted. The lead frame was connected with a driving circuit, and a back light was placed below the polarizer (84) (the opposite side to the common substrate (81)) to construct a liquid crystal display device.

The liquid crystal display device according to the first embodiment illustrated in FIG. 4G is different from the conventional example illustrated in FIG. 1A in that a plurality of protrusions (81d) that protrude into the liquid crystal layer (82) are formed on the common substrate (81) (a part of the region between the electrode (81b) and the alignment film (81c)). In the other points, it is the same as the conventional example illustrated in FIG. 1A.

By using a stylus step meter, the cross-sectional profile of the protrusions (81d) protruding from the surface of the common substrate (81) was measured. When protrusions (81d) were formed with a height of approximately 2 μm, the width of the substrate-contact portion (bottom) of each protrusion (81d) was approximately 28 μm and the width of the upper face was approximately 7 μm. The measurement indicates that the cross-sectional shape of each protrusion (81d) is a tapered trapezoid (where the side in contact with the substrate is relatively long, the side not in contact with the substrate is relatively short, the lateral sides are inclined). The plurality of protrusions (81d) have, for example, a shape of truncated quadrangular pyramid and their heights from the substrate (common electrode (81b)) are equal to each other. In addition, a plurality of protrusions (81d) are arranged regularly in the inner region of the frame of the seal (86) that is placed between the substrates (80) and (81) in the shape of a frame.

Figure 5:
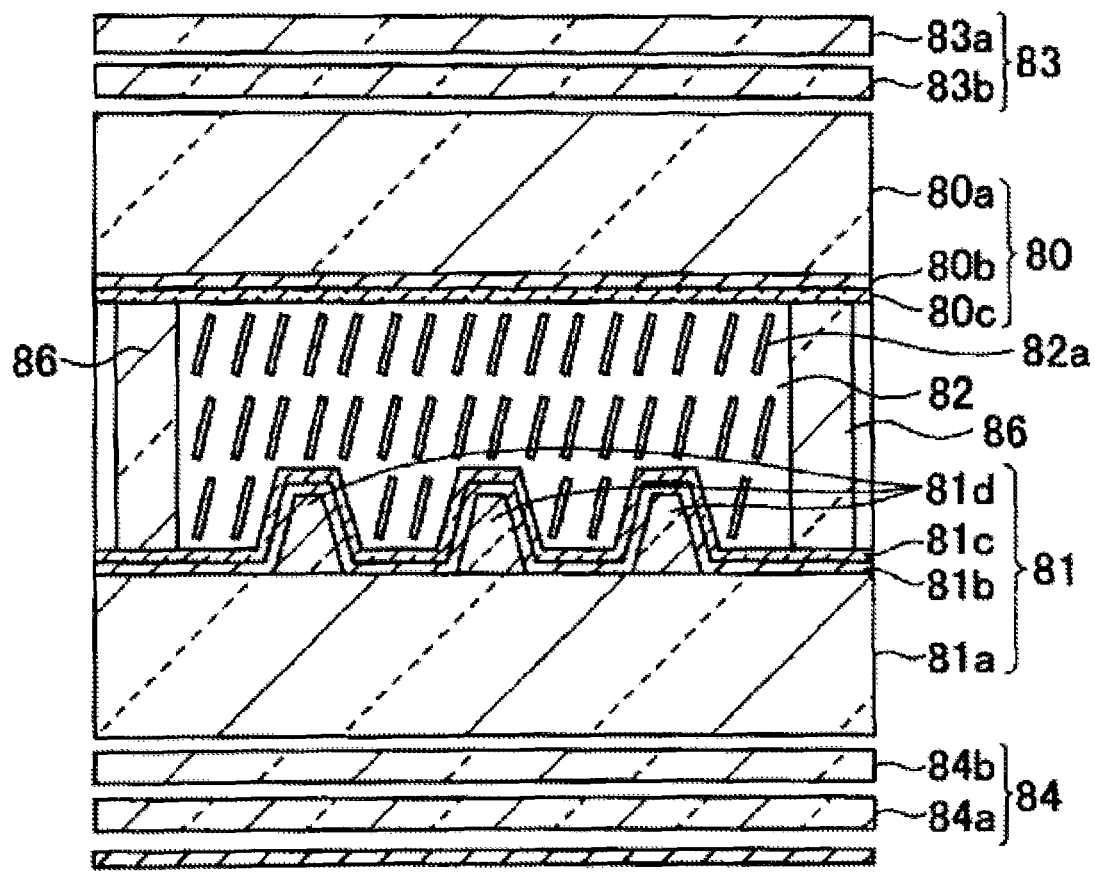
FIG. 5 is a schematic cross-sectional view illustrating a liquid crystal display device according to a second embodiment.

FIG. 5 is a schematic cross-sectional view illustrating a liquid crystal display device according to a second embodiment. In the liquid crystal display device according to the first embodiment, a vertical alignment film (81c) is applied over the protrusions (81d) formed on a common electrode (81b), while in the second embodiment, the protrusions (81d) are formed on a glass substrate (81a), and a common electrode (81b) and a alignment film (81c) are formed on the glass substrate (81a) and the protrusions (81d) in this order.

When manufacturing a liquid crystal display device according to the second embodiment, a common substrate (81) may be formed by forming protrusions (81d) on a glass substrate (81a), forming a common electrode (81b) thereon by film-forming and patterning steps, and applying a vertical alignment film (81c) thereon.

Figure 6:
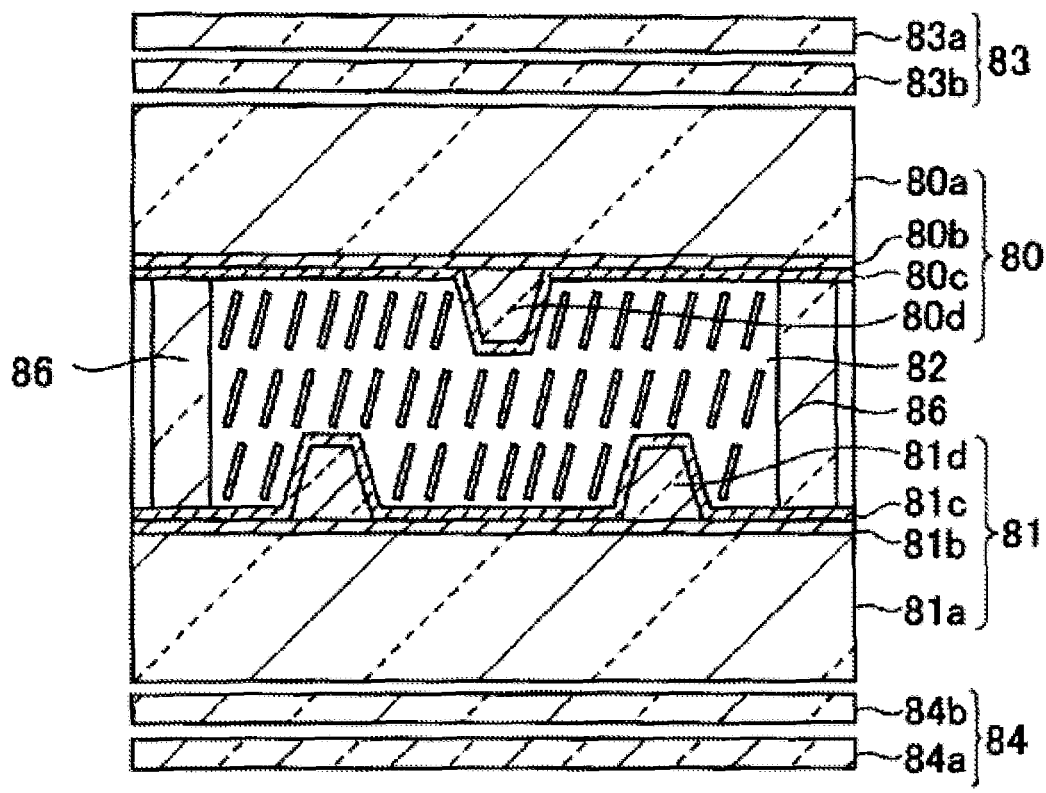
FIG. 6 is a schematic cross-sectional view illustrating a liquid crystal display device according to a third embodiment.

FIG. 6 is a schematic cross-sectional view of a liquid crystal display device according to a third embodiment. In the first embodiment, the protrusions (81d) are formed only on the substrate (81), while in the third embodiment, a plurality of protrusions (80d) and (81d) are formed on the substrates (80) and (81). The height of the protrusions (80d) formed on the segment substrate (80) is equal to the height of the protrusions (81d) formed on the common substrate (81). In the segment substrate (80), the protrusions (80d) are formed on the segment electrode (80b) and the alignment film (80c) is formed over the segment electrode (80b) and the protrusions (80d). Similarly to the protrusions (81d), the plurality of protrusions (80d) are also arranged regularly in the inner region of the seal (86) frame. The plurality of protrusions (80d) and the plurality of protrusions (81d) are arranged so that they do not overlap when observed from the front of the liquid crystal display device (when observed from the normal direction of the segment substrate (80) and the common substrate (81)).

Figure 7:
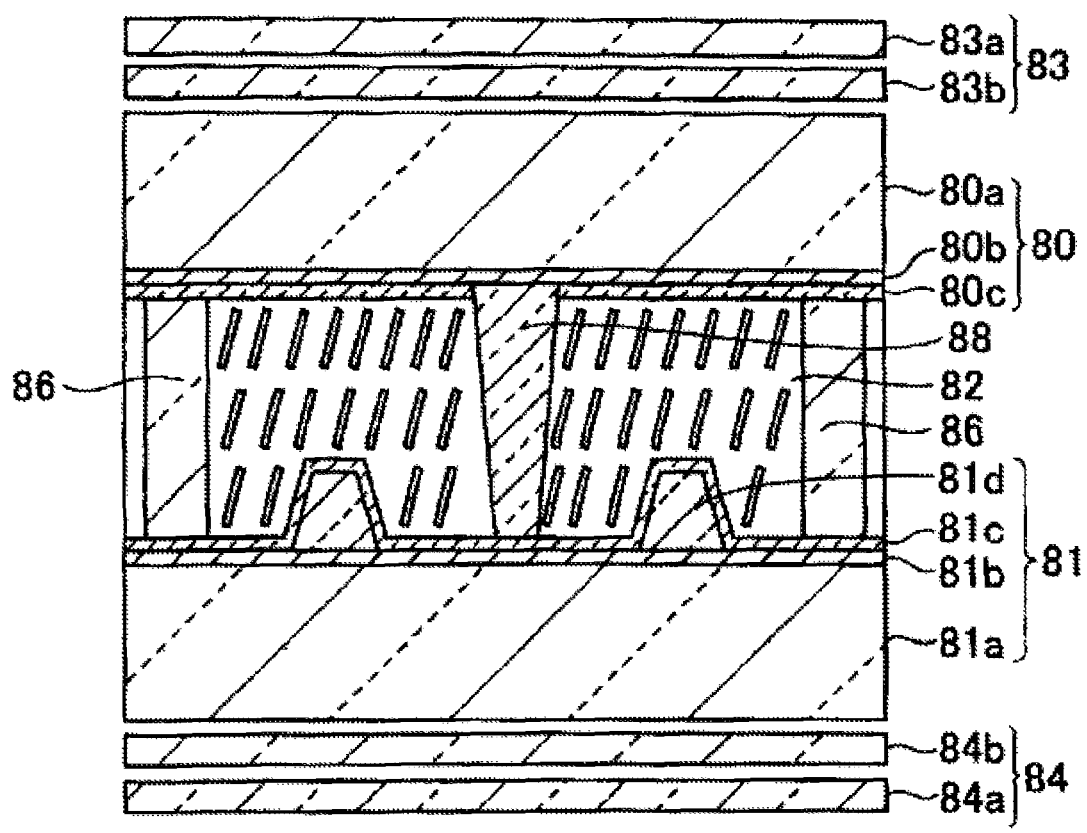
FIG. 7 is a schematic cross-sectional view illustrating a liquid crystal display device according to a fourth embodiment.

FIG. 7 is a schematic cross-sectional view illustrating a liquid crystal display device according to a fourth embodiment. In the first embodiment, spherical spacers are arranged on the plane at random to control the height of the liquid crystal layer (82), while in the fourth embodiment, a plurality of columnar spacers (88) are used to control the height of the liquid crystal layer (82) and to maintain the upper and lower substrates (80) and (81) substantially in parallel. According to the example illustrated in the figure, the columnar spacers (88) are formed on the segment substrate (80) where protrusions are not formed. The method of forming the columnar spacers (88) is the same as that of forming the protrusions (81d). The columnar spacers (88) are also confined in the inner region of the frame-shaped seal (86). In addition, they are located at positions opposite to those regions of the common substrate (81) where protrusions (81d) do not exist. In other words, the plurality of spacers (88) and the plurality of protrusions (81d) are arranged so that they do not overlap when viewed from the normal direction of the segment substrate (80) and the common substrate (81). As the upper faces of the columnar spacers (88) are located on those regions of the common substrate (81) where protrusions (81d) do not exist, the upper and lower substrates (80) and (81) are disposed depending on the height of the columnar spacers (88).

Figure 8:
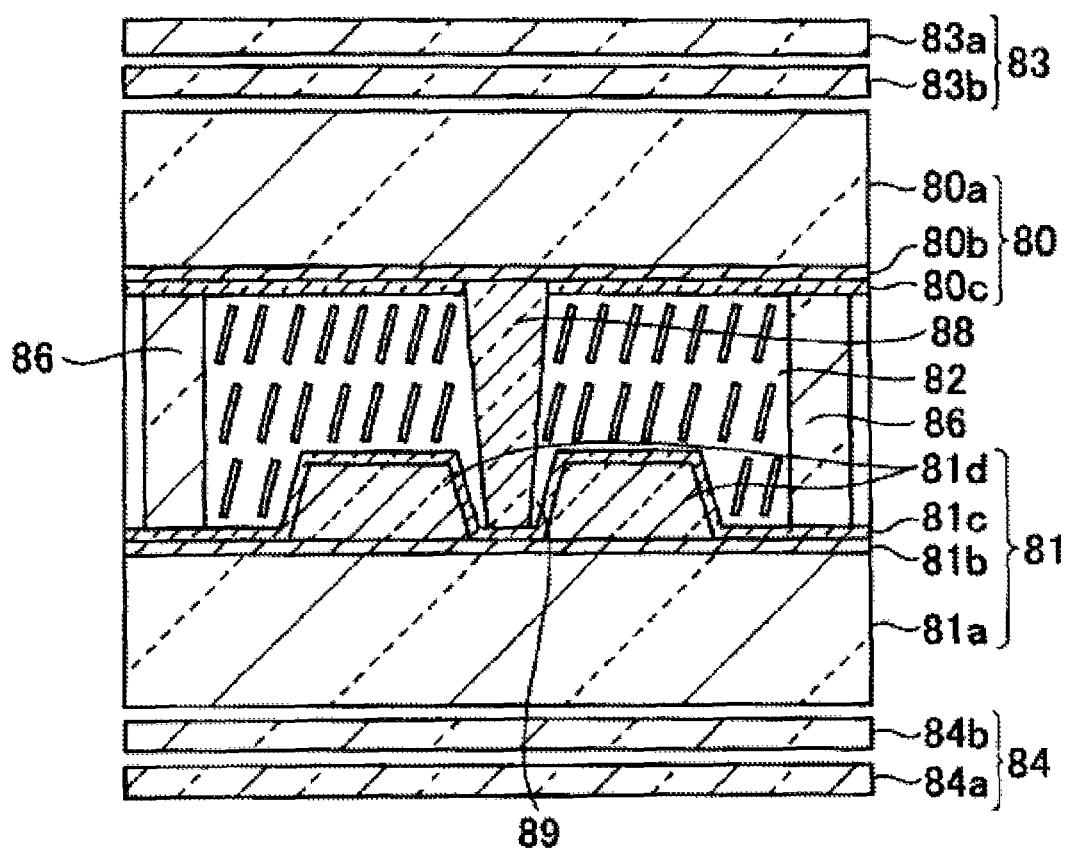
FIG. 8 is a schematic cross-sectional view illustrating a liquid crystal display device according to a fifth embodiment.

FIG. 8 is a schematic cross-sectional view of a liquid crystal display device according to a fifth embodiment. In the fourth embodiment, a plurality of spacers (88) are arranged on the segment substrate (80) at positions opposite to the regions where protrusions (81d) are not arranged, while in the fifth embodiment, at least one spacer (88) is located on the segment substrate (80) at a position opposite to, for example, a region containing a tapered rectangular (gold ingot shaped) protrusion (81d). In such a case, a recess (89) whose bottom face coincides with the substrate surface is formed in a part of a protrusion (81d) and a columnar spacer (88) is formed at a position on the segment substrate (80) opposite to the recess (89) so that a protrusion (81d) does not exist in the portion where the columnar spacer (88) exists.

In all of the first to fifth embodiments, a back light equipped with a light source such as a cold cathode tube, an inorganic LED, an organic LED, a light bulb, or the like is placed below the lower polarizer (84) and the display status is observed from above the upper polarizer (83).

In any of the first to fifth embodiments, the thickness of the liquid crystal layer in the structural portions where protrusions do not exist between the upper and lower substrates (80) and (81) is expressed as d1 and the thickness of the liquid crystal layer between the upper faces of the protrusions that exist on one substrate and the opposite substrate is expressed as d2 (for example, refer to FIG. 4G). Here, the relation 0<or=d2<d1 is satisfied. The area of the upper faces of the plurality of protrusions (the area of the regions where the thickness of the liquid crystal layer is d2 when viewed from the normal direction of the substrates (80) and (81)) is preferably 5% to 50% of the area of the substrate surface (the area of the range where the liquid crystal layer exists when viewed from the normal direction of the substrates (80) and (81), or the area of the region where the liquid crystal layer (82) exists on the substrate (81) having the protrusions (81d)). If the value is larger than 50%, impurities included in the resin constituting the protrusions may cause defective cell thickness. Particularly, because the surface of transparent negative-type photosensitive resin used in the embodiments becomes tacky after coating and pre-baking, dust once adhered to the surface is difficult to remove. If the value is less than 5%, the effect of protrusion formation, which will be described later, may not be sufficiently exhibited.

Moreover, for the in-plane arrangement of protrusions, it is preferable that the protrusions are arranged in a cyclic manner regardless of the patterns of the electrodes (80b) and (81b) on the upper and lower substrates (80) and (81).

FIGS. 9A to 9E are schematic plan views illustrating protrusions on one substrate, for example, an arrangement of protrusions (81d) on the common substrate (81).

Figure 9A:
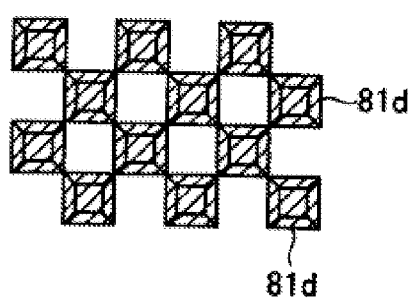
FIGS. 9A to 9E are schematic plan views illustrating the placement aspects of protrusions on one substrate, for example, protrusions (81d) on a common substrate (81).
Figure 9B:
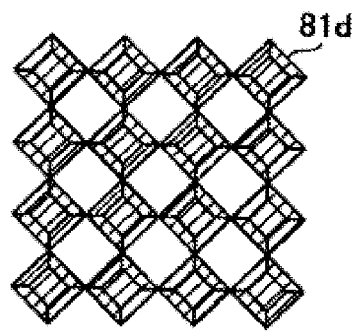
Figure 9C:
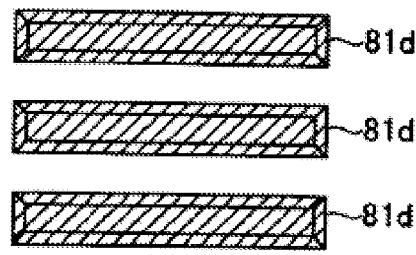
Figure 9D:
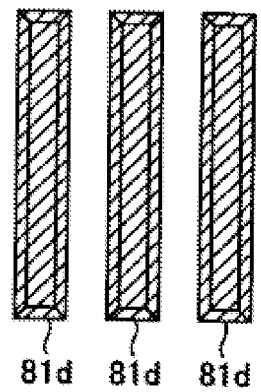
Figure 9E:
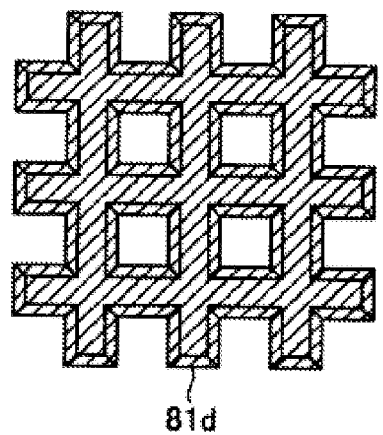

For example, as illustrated in FIG. 9A, it is possible to arrange truncated quadrangular pyramid-shaped protrusions (81d), which are substantially rectangular in plan view, in a checkerboard pattern. Or, as illustrated in FIG. 9B, it is also possible to arrange truncated quadrangular pyramid-shaped protrusions (81d), which are substantially diamond-shaped in plan view, in a checkerboard pattern. Illustrated in FIG. 9C is an example of arranging a plurality of gold ingot-shaped protrusions (81d) in the lateral direction of the liquid crystal display device so that they are belt-shaped in plan view. FIG. 9D illustrates an example of arranging a plurality of gold ingot-shaped protrusions (81d) in the lateral direction of the liquid crystal display device so that they are belt-shaped pattern in plan view. FIG. 9E illustrates an example of arranging a plurality of gold ingot-shaped protrusions (81d) in the lateral and vertical direction of the liquid crystal display device so that they are lattice-shaped in plan view. In FIGS. 9A to 9E, protrusions (81d) are arranged cyclically and regularly.

The arrangement cycle of protrusions (81d) is set so that non-uniformity in brightness and color tone is not observed when the liquid crystal display device is viewed from a large polar angle with respect to the normal direction of the substrate. For example, in an example illustrated in FIG. 9A, where the area of the bottom faces of the protrusions (81d) is set to 50% of the area of the substrate (81) in the liquid crystal layer (82), the length of one side of the rectangular bottom face of a protrusion (81d) is preferably set to 5 μm or more but not more than 100 μm, and more preferably 7 μm or more but not more than 50 μm. The arrangement cycle of protrusions (81d) may be set in such a way that the arrangement cycle of the center of gravity of the rectangular bottom face of a protrusion (81d) is twice the length of one side of the rectangular bottom surface.

When the area of the bottom faces of the protrusions (81d) is 25% of the area of the substrate (81) in the liquid crystal layer (82), the observed non-uniformity can be reduced by setting the arrangement cycle to equal to that of the arrangement illustrated in FIG. 9A and setting the length of one side of the rectangular bottom face to $2^{-1/2}$ times that in the arrangement illustrated in FIG. 9A.

The present inventor performed simulation analysis for the combination of the liquid crystal layer thicknesses d1 and d2 and the ratio of the area of the region with a liquid crystal layer thickness of d1 to the area of the region with a liquid crystal layer thickness of d2 in which leaked light has a low luminous transmissivity and a neutral color in the absence of voltage applied to the liquid crystal layer (82) when the liquid crystal display device according to the first embodiment is observed from a polar angle of 50° with respect to the normal direction of the substrate at an azimuthal angle of 0 to 180 degrees (three o'clock direction, an azimuthal angle of 45° to the absorption axes of either of the polarizing layers (83a) and (84a)) by using an LCDMASTER7.2 manufactured by SHINTECH Co. Ltd. Here, the neutral color region was defined as a region in which the chromaticity coordinates x and y are both 0.28 or more but less than 0.34 when a D65 standard light source was used as a light source. For simulation, an SKN18243T manufactured by Polatechno Co., Ltd., was assumed as a polarizer and a norbornene-based cyclic olefin biaxially stretched film was assumed as a biaxial film, and the refractive index anisotropy of the liquid crystal Δn was set to 0.0914. Under these conditions, the liquid crystal layer thickness that gave the lowest luminous transmissivity at an azimuthal angle of 0° and a polar angle of 50° was 3.4 μm in the conventional liquid crystal element illustrated in FIGS. 1A and 1B. Therefore, in the simulation, with the lower limit of the liquid crystal layer thickness d1 assumed to be 3.4 μm and the range of the liquid crystal layer thickness d2 assumed to be about 0 μm to 3 μm, the present inventor investigated the range in which the ratio of the area of the region with a liquid crystal layer thickness of d2 to the in-plane area of the substrate (81) where the liquid crystal layer (82) existed (occupied area ratio α) was between 5 to 50%.

Figures 10A, 10B:
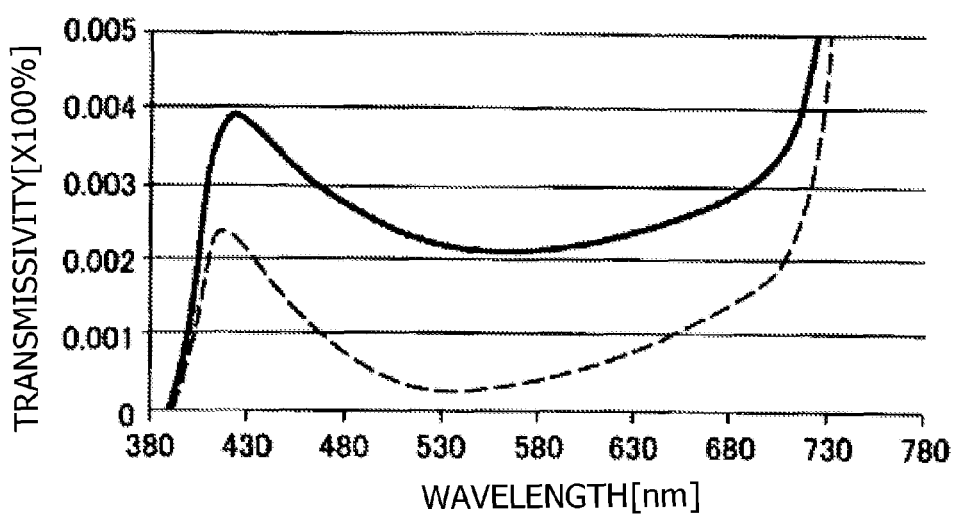
FIGS. 10A and 10B are graphs illustrating simulation results.

FIG. 10A is a graph illustrating the investigation result. The horizontal axis of the graph indicates d1 in μm which is the liquid crystal layer thickness in the region where protrusions (81d) do not exist on the substrate (81), while the vertical axis of the graph indicates d2 in μm which is the liquid crystal layer thickness in the region where protrusions (81d) exist. The numeric values described in cells at the intersections of values in the vertical axis and values in the horizontal axis indicate examples of the occupied area ratio α in %. The hatched area indicates the range where a neutral color is realized and the luminous transmissivity can be lowered compared with the cases indicated with a dashed line in FIG. 3 in the range of 0.28 or more but less than 0.34 for both the chromaticity coordinates x and y. In this range, the difference between the liquid crystal layer thicknesses d1 and d2 is 1 μm or more but not more than d1.

FIG. 10B presents graphs illustrating spectra in the absence of applied voltage in the liquid crystal display device according to the first embodiment and in the liquid crystal display device according to the conventional example (FIGS. 1A and 1B). The simulation analysis result illustrated in the figure is spectra in the absence of applied voltage observed from an azimuthal angle of 0° (three-o'clock direction) and a polar angle of 50°. The horizontal axis indicates the light wavelength in nm, while the vertical axis indicates the luminous transmissivity in %. The solid line indicates an optical spectrum of the liquid crystal display device according to the first embodiment under the following conditions: d1 is 3.6 μm, d2 is 2.6 μm, and the percentages of the area of the region with a liquid crystal layer thickness of d1 and the area of the region with a liquid crystal layer thickness of d2 are 60% and 40%, respectively. The dashed line indicates an optical spectrum of the liquid crystal display device according to the conventional example in the case where the liquid crystal layer thickness is uniform in 3.4 μm.

In both the examples indicated by a solid line and a dashed line, the luminous transmissivity is significantly suppressed compared with the example indicated by a dashed line in FIG. 3 (the liquid crystal display device according to the conventional example using a C plate). In the liquid crystal display device according to the conventional example that gives the optical spectrum indicated by a dashed line, a blue-violet color is observed in appearance because the light leakage around a wavelength of 550 nm is significantly lowered, while light leakage takes place in the short wavelength region and the long wavelength region. On the other hand, in the liquid crystal display device according to the embodiment that gives the optical spectrum indicated by a solid line, the luminous transmissivity is higher than that of the conventional example, but light leakage is observed in the whole wavelength region. Because the luminous transmissivity in the short wavelength region and long wavelength region is relatively high but light leakage is caused also at a high visibility region in the vicinity of 550 nm, a neutral color is observed in appearance.

The liquid crystal display device according to the embodiment is a liquid crystal display device that prevents colored light leakage and ensures good quality.

Figure 11:
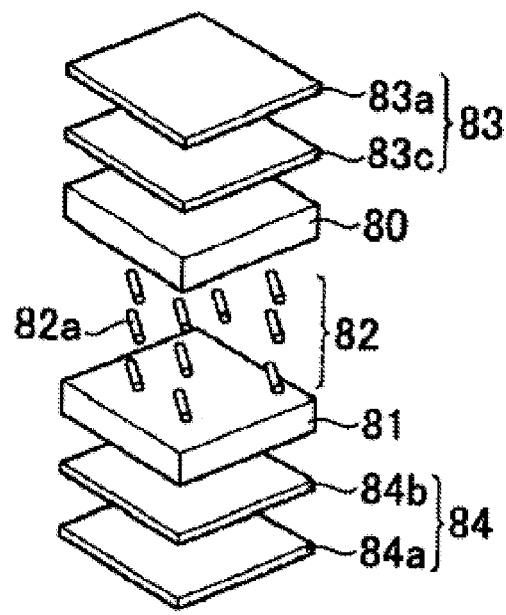
FIG. 11 is a schematic perspective view illustrating a liquid crystal display device according to a first variation.

FIG. 11 is a schematic perspective view illustrating a liquid crystal display device according to a first variation. For the liquid crystal display device in the first to fifth embodiments, a biaxial film (84b) is placed between one of the polarizing layers (84a) and one of the substrates (81), but in the first variation, biaxial films (83c) and (84b) are placed between the polarizing layer (83a) and the substrate (80) and between the polarizing layer (84a) and the substrate (81), respectively. The liquid crystal display device according to the first variation prevents colored light leakage and ensures good quality as in the case of the first to fifth embodiments.

Figure 12:
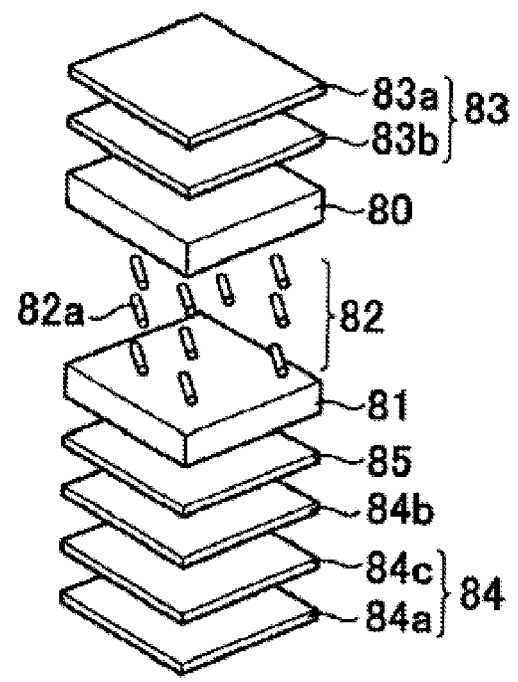
FIG. 12 is a schematic perspective view illustrating a liquid crystal display device according to a second variation.

FIG. 12 is a schematic perspective view illustrating a liquid crystal display device according to a second variation. The first to fifth embodiments and the first variation use only a biaxial film as a viewing angle compensation plate. For example, to obtain a larger display capacity by increasing the number of scanning lines during multiplex driving, increasing the retardation of the liquid crystal layer is effective to improve the steepness of the electro-optical characteristics. As a measure for this, a biaxial film and a C plate may be stacked and placed at least either between the polarizing layer (83a) and the substrate (80) or between the polarizing layer (84a) and the substrate (81), although it is also effective to increase the thickness direction retardation of the biaxial plates (83c) and (84b) in the embodiment and the first variation. In this case, the biaxial film is placed on the polarizing layer side, while the C plate is placed on the substrate side.

In the second variation, between the polarizer (84) and the substrate (81), the biaxial film (84b) is placed adjacent to the polarizer (84) and the C plate (85) is placed adjacent to the substrate (81).

In the second variation, the biaxial film (84b) and the C plate (85) are stacked, but it is also possible to place the biaxial film (84b) between one polarizing layer and a substrate and place the C plate (85) between the other polarizing layer and the other substrate.

The present inventor also performed simulation for the liquid crystal display device according to the second variation in the same way as for the liquid crystal display device according to the first embodiment which gave the result illustrated in FIGS. 10A and 10B. For simulation, SHC13U manufactured by Polatechno Co., Ltd., was assumed as a polarizer and a norbornene-based cyclic olefin biaxially stretched film was assumed as a biaxial film, and the refractive index anisotropy of the liquid crystal material Δn was set to 0.15. Under these conditions, the liquid crystal layer thickness that gave the lowest luminous transmissivity at an azimuthal angle of 0° and a polar angle of 50° was 4 μm in the conventional example of the liquid crystal element illustrated in FIGS. 1A and 1B. Therefore, in the simulation, with the lower limit of the liquid crystal layer thickness d1 assumed to be 4 μm and the range of the liquid crystal layer thickness d2 assumed to be about 0 μm to 3.9 μm, the present inventor investigated the range in which the ratio of the area of the region with a liquid crystal layer thickness of d2 to the area of the substrate (81) in the liquid crystal layer (82) (occupied area ratio α) was between 5 to 50%.

Figures 13A, 13B:
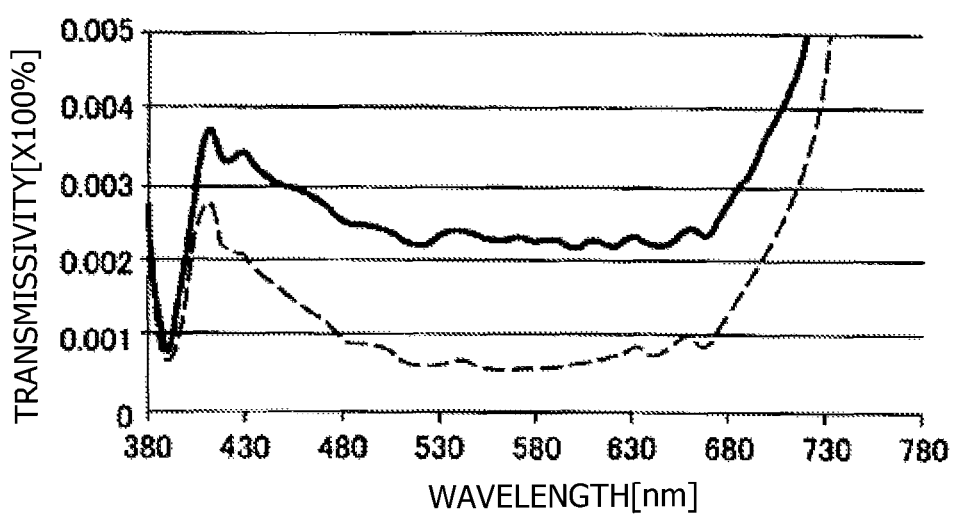
FIGS. 13A and 13B are graphs illustrating simulation results.

FIG. 13A is a graph illustrating the investigation result. The meanings of the two axes are the same as those in FIG. 10A. The graph indicates that the leaked light has a decreased luminous transmissivity and a neutral color when the occupied area ratio α is 5% or more but not more than 50% while the difference between d1 and d2 is 0.5 μm or more.

FIG. 13B presents graphs illustrating optical spectrums in the absence of applied voltage for the liquid crystal display device according to the second variation and the liquid crystal display device according to the conventional example (FIGS. 1A and 1B). The simulation analysis result in the figure illustrates optical spectra in the absence of applied voltage observed from an azimuthal angle of 0° (three-o'clock direction) and a polar angle of 50°. The meanings of the two axes are the same as those in FIG. 10B. The solid line indicates an optical spectrum of the liquid crystal display device according to the second variation under the following conditions: d1 is 4.0 μm, d2 is 3.5 μm, and the percentages of the area of the region with a liquid crystal layer thickness of d1 and the area of the region with a liquid crystal layer thickness of d2 are 65% and 35%, respectively. The dashed line indicates an optical spectrum of the liquid crystal display device according to the conventional example in the case where the liquid crystal layer thickness is uniform in 4.0 μm.

In both the examples indicated by a solid line and a dashed line, the luminous transmissivity is significantly suppressed compared with the example indicated by a dashed line in FIG. 3 (the liquid crystal display device according to the conventional example using a C plate). In the liquid crystal display device according to the conventional example that gives the optical spectrum indicated by a dashed line, a blue-violet color is observed in appearance because the light leakage around a wavelength of 550 nm is significantly lowered, while light leakage takes place in the short wavelength region and the long wavelength region. On the other hand, in the liquid crystal display device according to the second variation that gives the optical spectrum indicated by a solid line, the luminous transmissivity is higher than that of the conventional example, but light leakage is observed in the whole wavelength region. Because the luminous transmissivity in the short wavelength region and the long wavelength region is relatively high but light leakage is caused also at a high visibility region in the vicinity of 550 nm, a neutral color is observed in appearance.

The liquid crystal display device according to the second variation is also a liquid crystal display device that prevents colored light leakage and can ensures good quality.

Thus, the present invention has been described above based on embodiments thereof, but the invention should not be construed as being limited thereto. Various modifications, alterations, and combinations will become apparent to those skilled in the art.

The process can be applied, for example, to liquid crystal display devices having a vertically aligned liquid crystal layer and using at least one biaxial film as its viewing angle compensation means. It can be used for a segment display type statically driven liquid crystal display device, a segment display type simple matrix driven liquid crystal display device, a dot matrix display type simple matrix driven liquid crystal display device, a liquid crystal display device containing both a segment display type simple matrix driven liquid crystal display device and a dot matrix display type simple matrix driven liquid crystal display device, and an active matrix driven (including TFT driven) liquid crystal display device.

What are claimed are:

1. A liquid crystal display device comprising:
   a first substrate and a second substrate placed substantially in parallel to each other, each having a transparent electrode,
   a sealing material being in a shape of a frame and placed between the first and second substrates,
   a vertically aligned liquid crystal layer located between the first and second substrates, placed within an inner region of the frame of the sealing material, and filled with a liquid crystal material having negative dielectric anisotropy,
   a first polarizing layer and a second polarizing layer placed substantially in crossed-Nicol, the first polarizing layer being placed on an opposite side of the first substrate to the liquid crystal layer, the second polarizing layer being placed on an opposite side of the second substrate to the liquid crystal layer, and one of the first and second polarizing layers having an absorption axis at approximately 45° with respect to an alignment direction of liquid crystal molecules located at a thickness center of the liquid crystal layer in the presence of applied voltage,
   an optical compensation plate having negative biaxial optical anisotropy, placed at least one of (i) between the first substrate and the first polarizing layer, and (ii) between the second substrate and the second polarizing layer, and disposed so that an in-plane slow axis direction is substantially orthogonal to an absorption axis direction of a proximate one of the first and second polarizing layers, and
   a plurality of spacers that are arranged between the first substrate and the second substrate and that control a thickness of the liquid crystal layer;
   wherein at least one of the first substrate and the second substrate has a plurality of protrusions having approximately the same first height and protruding into the liquid crystal layer, wherein the plurality of protrusions do not function as the spacers, do not support an opposite one of the first and second substrates, and do not control the thickness of the liquid crystal layer,
   wherein the plurality of protrusions are formed only within the inner region of the frame of the sealing material,
   wherein the liquid crystal layer at a protrusion-free position has a second height,
   wherein an area of a region in which the thickness of the liquid crystal layer is equal to a value obtained by subtracting the first height from the second height as a result of the existence of the protrusions accounts for α%, which is 5% or more but not more than 50%, of an area of a region where the liquid crystal layer exists on said at least one of the first and second substrates with the protrusions, and
   wherein the first height is 0.5 μm or more and less than the second height.

2. A liquid crystal display device according to claim 1, wherein the plurality of protrusions are arranged regularly.

3. A liquid crystal display device according to claim 1, wherein the first height, the second height, and the value α% have values that allow a color tone of leaked light, observed from a polar angle of 50° at an azimuthal angle of 45° with respect to the absorption axis direction of the proximate one of the first and second polarizing layers, to meet the relations of 0.28 or more but less than 0.34 with respect to chromaticity coordinates x and y when no voltage is applied to the liquid crystal layer, and when a D65 standard light source is used as a light source.

4. A liquid crystal display device according to claim 1, wherein a cross-sectional shape of each of the protrusions is a tapered trapezoid where a side in contact with said at least one of the first and second substrates is relatively long, a side not in contact with said at least one of the first and second substrates is relatively short, and lateral sides are inclined.

5. A liquid crystal display device according to claim 1, wherein both the first and second substrates have a plurality of protrusions protruding into the liquid crystal layer, wherein first protrusions of the first substrate and second protrusions of the second substrate are arranged so that they do not overlap each other when viewed from a normal direction of the first and second substrates, and wherein the first and second protrusions do not control the thickness of the liquid crystal layer.

6. A liquid crystal display device according to claim 1, wherein said one of the first and second substrates has the plurality of protrusions while the other of the first and second substrates has the plurality of spacers that are columnar and that control the thickness of the liquid crystal layer, wherein the plurality of columnar spacers are formed at those positions on said other substrate which are located opposite to those regions of said one of the first and second substrates which are free from the plurality of protrusions.

7. A liquid crystal display device according to claim 1, wherein said one of the first and second substrates has the plurality of protrusions while the other of the first and second substrates has the plurality of spacers that are columnar and that control the thickness of the liquid crystal layer, wherein recesses are formed in the plurality of protrusions, and the columnar spacers are placed at positions on the other substrate opposite to the recesses.

8. A liquid crystal display device manufacturing process comprising using a pair of mother substrates to produce a liquid crystal display device comprising:
   a first substrate and a second substrate placed substantially in parallel to each other, each having a transparent electrode,
   a sealing material being in a shape of a frame and placed between the first and second substrates,
   a vertically aligned liquid crystal layer located between the first and second substrates, placed within an inner region of the frame of the sealing material, and filled with a liquid crystal material having negative dielectric anisotropy,
   a first polarizing layer and a second polarizing layer placed substantially in crossed-Nicol, the first polarizing layer being placed on an opposite side of the first substrate to the liquid crystal layer, the second polarizing layer being placed on an opposite side of the second substrate to the liquid crystal layer, and one of the first and second polarizing layers having an absorption axis at approximately 45° with respect to an alignment direction of liquid crystal molecules located at a thickness center of the liquid crystal layer in the presence of applied voltage,
   an optical compensation plate having negative biaxial optical anisotropy, placed at least one of (i) between the first substrate and the first polarizing layer, and (ii) between the second substrate and the second polarizing layer, and disposed so that an in-plane slow axis direction is substantially orthogonal to an absorption axis direction of a proximate one of the first and second polarizing layers, and
   a plurality of spacers that are arranged between the first substrate and the second substrate and that control a thickness of the liquid crystal layer;

wherein at least one of the first substrate and the second substrate has a plurality of protrusions having approximately the same first height and protruding into the liquid crystal layer, wherein the plurality of protrusions do not function as the spacers, do not support an opposite one of the first and second substrates, and do not control the thickness of the liquid crystal layer, wherein the plurality of protrusions are formed only within the inner region of the frame of the sealing material, wherein the liquid crystal layer at a protrusion-free position has a second height, wherein an area of a region in which the thickness of the liquid crystal layer is equal to a value obtained by subtracting the first height from the second height as a result of the existence of the protrusions accounts for $\alpha\%$, which is 5% or more but not more than 50%, of an area of a region where the liquid crystal layer exists on said at least one of the first and second substrates with the protrusions, wherein the first height is 0.5 μm or more but less than the second height, and wherein the plurality of protrusions are not formed outside the inner region of the frame of the sealing material on the pair of mother substrates.

\* \* \* \* \*